Feb. 24, 1942.    J. A. CHATER    2,274,359
COTTON DUSTER
Filed April 14, 1937    2 Sheets-Sheet 1

Inventor
John A. Chater
By A. S. McDaniel
Attorney

Feb. 24, 1942. J. A. CHATER 2,274,359
COTTON DUSTER
Filed April 14, 1937 2 Sheets-Sheet 2
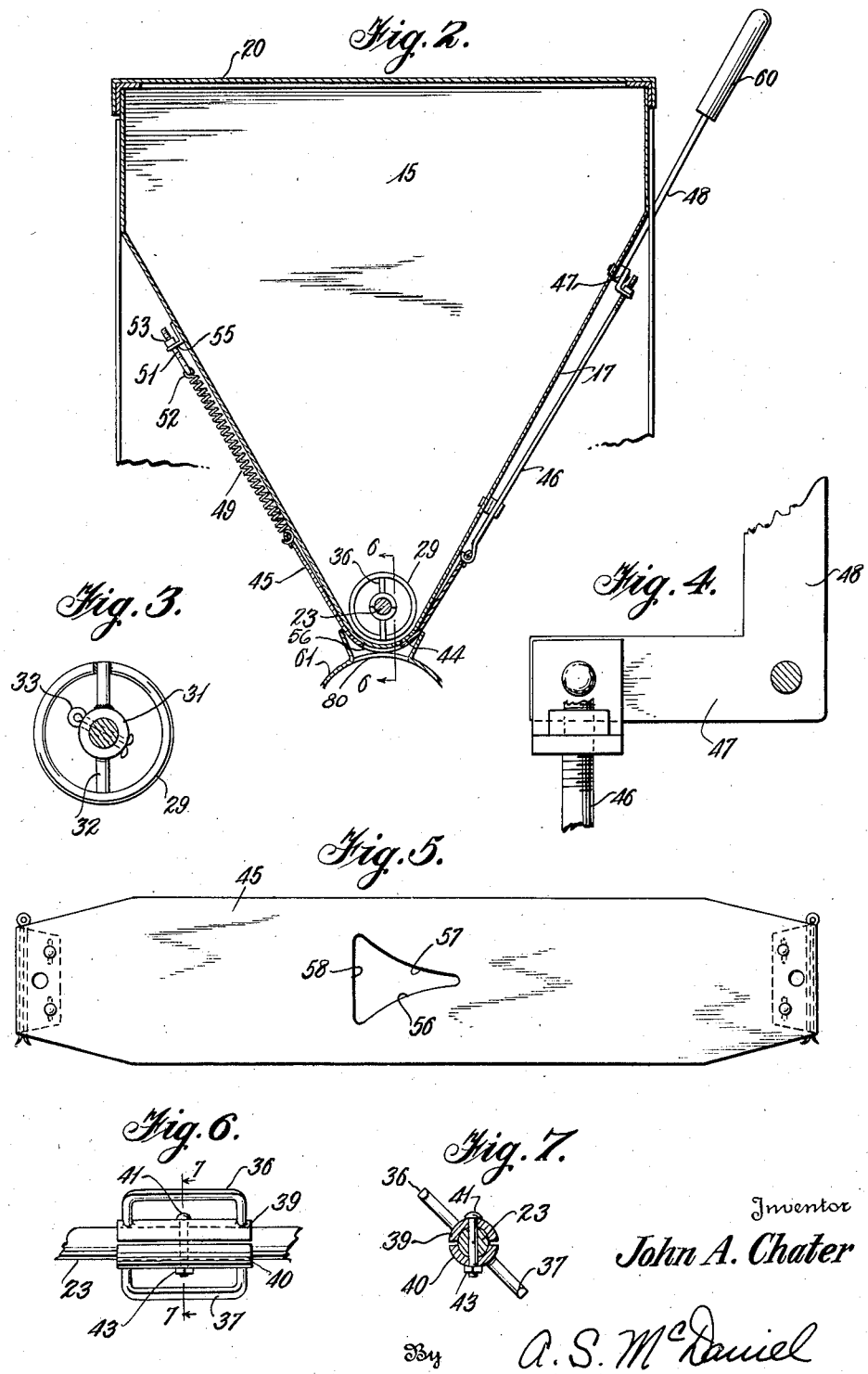

Patented Feb. 24, 1942

2,274,359

UNITED STATES PATENT OFFICE 2,274,359

COTTON DUSTER

John A. Chater, Medina, N. Y., assignor to Niagara Sprayer and Chemical Co., Inc., Middleport, N. Y., a corporation Application April 14, 1937, Serial No. 136,960

1 Claim. (Cl. 221—130)

This invention relates to a method of and apparatus for applying insecticides and fungicides in dust form and more particularly to a constant rate method and apparatus by operation of which insecticidal and fungicidal powders may be distributed while entrained in an air blast for deposition upon vegetation.

Heretofore, it has been a practice in the application of insecticidal or fungicidal powders to vegetation to discharge a regulated amount of the powder through spaced distributing nozzles. Practical employment of the dusting operation finds its highest utility with respect to large scale agricultural operations, in consequence of which it is ordinarily desirable to provide for the distributing nozzles a large supply of the insecticidal or fungicidal powder, in order to permit continuous operation without frequent interruption for replenishment of supply. Extensive experience over a period of years has demonstrated the advantages inherent in the provision of a portable supply reservoir wherein a large supply of the powder is maintained immediately available for distribution.

The large quantities of the powder with which the reservoir is necessarily charged may produce a substantial impaction in the bottom thereof, which tends to prevent the smooth, regular feeding of the powdered insecticides. This difficulty has been overcome heretofore by providing a rotary pusher or feeding mechanism for the powder whereby the powder is agitated and forced toward one end of the reservoir, there to be scooped up by appropriate rotary buckets which carry it upwardly and dump it into an auxiliary hopper which is provided in turn with rotary vanes to throw the powder and further prevent its packing during transfer into the distributing elements. This mechanism is described and claimed in my copending application Ser. No. 72,405, of which the present application may be considered a continuation in part.

In some instances, difficulty has arisen in that the mechanism for agitating and transferring the powder toward one end, and conveyance from main to auxiliary hopper for subsequent transfer into the distributing elements, was found to be undesirably complicated and ponderous and to be inoperative to insure a smooth continuous stream of air-entrained powder for distribution by the distributing elements. Simplicity of construction enables dispensing with intricate, expensive, and ponderous mechanism, substituting therefor a gravity feed for the powder to the distributing elements.

This provision, in a convenient form, has its embodiment in a combined reservoir and hopper structure positioned directly above the distributing mechanism and communicating therewith through an easily controllable outlet orifice at the bottom of the combined reservoir and hopper. Opposed spiral screws rotate to propel the powder toward the outlet orifice and to churn the powder to prevent impaction, and associated feed wipers above the outlet orifice effectively prevent bridging over by agitating and fluffing the powder supply throughout.

It is therefore a primary object of the present invention to provide a reliable method of powder dusting, and an apparatus for distributing insecticidal and fungicidal powder which shall be simple, durable, and efficient.

It is a further object of this invention to provide a method of and apparatus for cushioning the column of powder to insure that the weight thereof be maintained substantially constant in the hopper.

Still another object of this invention is to provide a method of and apparatus for handling insecticidal and fungicidal powder for dusting distribution including maintaining the powder supply in a lightened condition in vertical alinement with the distributing mechanism whereby impaction and irregular feeding of powder is effectively prevented.

It is a further object of the present invention to provide a method of and apparatus for maintaining a constant head of powder on the feeding mechanism.

A further object of this invention is to provide a reliable method of and apparatus for feeding powder to be distributed at a predetermined rate.

Still a further object of this invention is the provision of a method of and apparatus for entraining the dust in an air stream of constant quality.

Further objects and advantages of the invention will be apparent from the following detailed description, considered in connection with the accompanying drawings forming part thereof in which:

Fig. 2 is a section taken on the line 2—2 of Fig. 1;

Fig. 3 is a section taken on the line 3—3 of Fig. 1;

Fig. 4 is a fragmentary enlarged view showing the mounting for controlling the outlet orifice;

Fig. 5 is an enlarged view of a feed regulator;

Fig. 6 is a section taken on the line 6—6 of Fig. 2; and

Fig. 7 is a section taken on the line 7—7 of Fig. 6.

Figure 1:
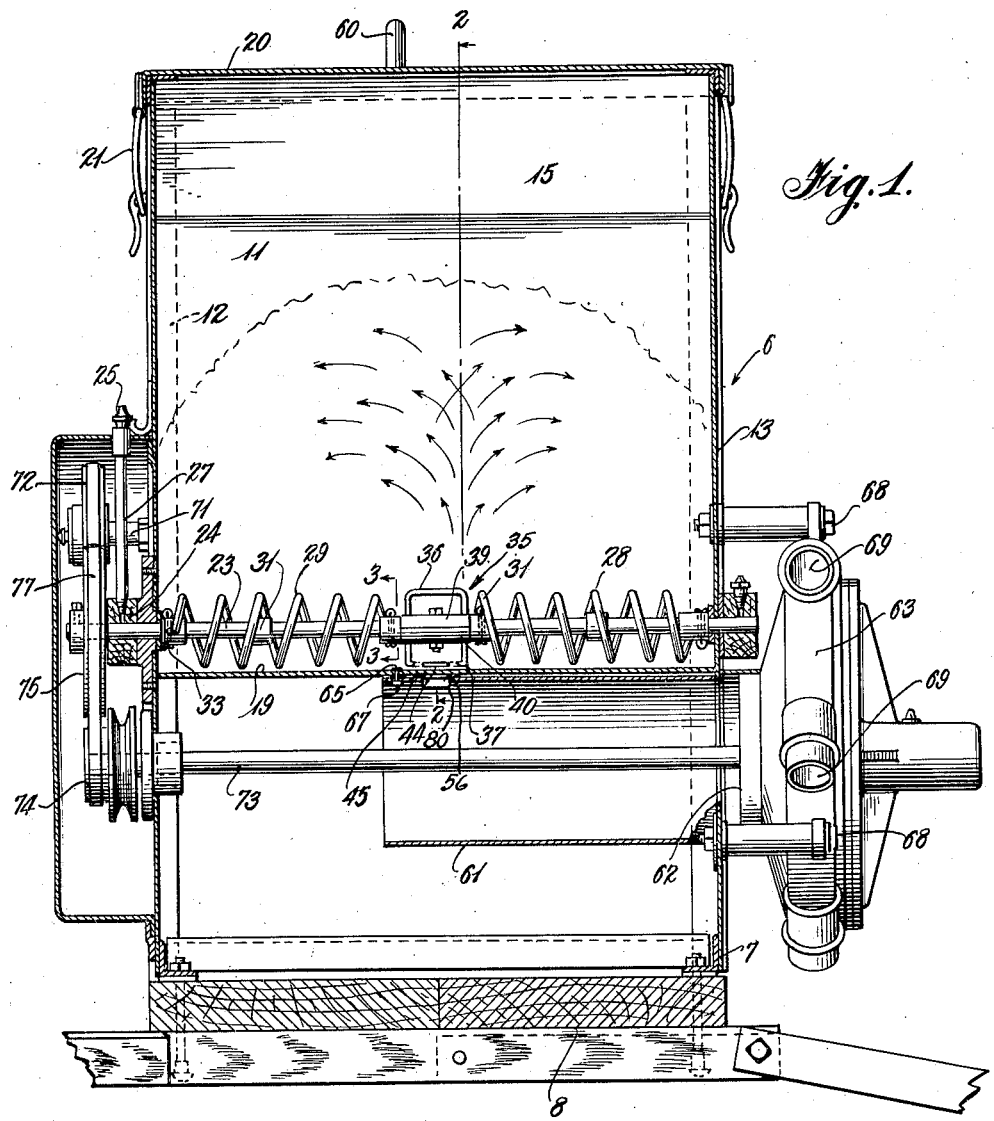
Fig. 1 is a transverse sectional view of a dusting apparatus including one embodiment of the invention.

Referring to the drawings wherein identical parts are indicated by similar reference numerals throughout the several views, a distributing mechanism generally designated by the numeral 6 is provided with a rigid base 7 bolted or otherwise suitably affixed to a rigid frame 8 forming part of, or for mounting upon, any suitable foundation such as a vehicle chassis (not shown). A sheet metal hopper 11 reinforced with angle irons 12 at the corners is formed by two end plates 13—13 having a bent sheet metal piece 15 welded between them to form straight upper sides 16, sloping sides 17, and a convex bottom portion 19, the latter having a relatively short radius for a purpose to be hereinafter explained. A covering 20 is provided and is held in place to close the hopper by latches 21. Vertically alined with the axis of the hopper bottom and immediately thereabove is a shaft 23 extending across the hopper and journaled in hardwood bearings 24—24 in the sides of the hopper, said bearings being suitably lubricated as by a grease gun 25 and pipe 27.

Right and left hand spiral screws 28 and 29 formed of round sectioned rod or heavy wire are each secured to the shaft 23 by a plurality of spaced collars 31, in the particular embodiment three such being illustrated. The collars 31 are welded to the screws 28 and 29 through intermediate short rods 32 which serve to hold the screws 28 and 29 concentric with shaft 23 and rigidly connected thereto. The two end collars 31 of each screw 28 and 29 are connected in driving relation with the shaft 23 by means of cotter pins 33, 33.

Referring particularly to Fig. 1, it will be observed that the spiral pushers or screws 28 and 29 do not occupy the whole length of the shaft 23 inside the hopper but are spaced intermediately thereof by a feed wiper 35. The feed wiper 35 occupies the shaft area between adjacent ends of the opposed spiral screws 28 and 29 and is composed of two opposite wires 36 and 37 preferably bent in the form shown and with their ends welded to semicircular metal pieces 39 and 40, respectively, formed by splitting tubing through the longitudinal axis. The wires 36 and 37 are welded to each half-tube 39 and 40 and mounted on the shaft 23 by a bolt 41 and nut 43, the bolt 41 passing through suitable alined apertures in the tube sections 39 and 40 and diametrically through the shaft 23. By loosening the nut 43 the two feed wires 36 and 37 may be adjusted or removed from the shaft 23 without disturbing the spiral members 28 and 29.

A small slot 44, shown in Figs. 1 and 2, is formed adjacent the bottom of the curved bottom 19 of the hopper but slightly to the right of the vertical axis of the shaft 23. It will be understood that the slot 44 constitutes an orifice providing communication between the hopper supply and the powder distributing mechanism to be described hereinafter. In order to regulate the rate of feed of the powder from the hopper, a thin flexible strip 45 of sheet brass or other flexible non-corroding metal is positioned against the under surface of the hopper at the slot 44. The feed regulator 45 is bent normally to conform to the curved bottom of the hopper and held tightly thereagainst by means of a screw 46 which secures one end of the feed regulator to the short arm 47 of a barrel crank and feed lever 48 which is pivoted to one sloping side 17 of the hopper. The feed regulator 45 is held in alinement with the slot 44 under tension of a spring 49 connected to the opposite end of the feed regulator by a screw 51 having a hook portion 52. The tension of spring 49 may be controlled by suitable adjustment of nut 53, the screw 51 passing through a clip 55 secured to the side of the hopper. By referring to Fig. 5, it will be observed that the feed regulator is provided with an orifice 56 of tapering conformation, one end 57 thereof being pointed and the opposite end 58 being of sufficient width to correspond with the length of the hopper outlet slot 44. When feed lever handle 60 is moved in one direction the regulator strip 45 is pulled transversely across the bottom of the hopper to vary the registry of the orifice 56 with respect to the feed slot 44 to thereby control the amount of dust fed from the hopper.

The powder distributing mechanism includes a large suction tube 61 made of sheet metal and having the same diameter as circular inlet 62 of fan housing 63. Tube 61, which may be formed of galvanized iron, is provided with a powder inlet opening 80 and is assembled with a screw 65 which passes therethrough and is secured to the bottom of the hopper by means of a thumb screw 67. Fan housing 63 is fixed to the end plate 13 of the hopper by means of bolts 68 and has any desired number, in the present instance six such being provided, of equally spaced outlets 69 in its periphery. The utility of said outlets and their adaptability for receiving connections for flexible metal hose leading to dust discharge nozzles remote from the hopper is fully described in my above-identified copending application and warrants no further detail here. Suffice it to say that in common with the tubular dust chamber 61, feed orifice 44, fan casing 63, and peripheral outlets 69, such flexible hose constitutes means for defining a continuous path for the dust-bearing air stream, the character of which is rendered constant by the co-action of the oppositely-feeding spiral wires and the feed wiper 35.

Power mechanism which may consist of the type of motor disclosed in my above-identified application is employed for actuating the fan and shaft 23, drive from such motor being accomplished through drive shaft 71 having pulley 72 thereon. A fan shaft 73 suitably journaled in opposite sides of the frame is provided at the opposite end with a sheave 74 in line with the pulley 72 and with a sheave 75 keyed to the end of shaft 23. A fan belt or other suitable type of transmission member 77 is employed to drive the fan shaft 73 and hopper shaft 23 from the power source. It will be understood that the relative speeds of the described shafts may be altered by varying the sizes of their respective pulleys and/or the interconnection of suitable speed-change pulleys in train therewith.

From the foregoing, it will be observed that the dust of the hopper will necessarily be properly broken up before it is fed from the hopper, by operation of the oppositely disposed pusher elements 28 and 29. As these elements revolve in a high speed, they offer relatively little resistance on account of the round wire used in them but nevertheless tend to throw the dust upwardly due to centrifugal force as the dust tends to revolve with the elements. This produces a churning of the dust and causes the dust to be brought over the element downwardly thereinto and prevents the dust mass from bridging over the screws. That the two screws feed in opposite directions insures that the dust mass will be steadily wormed toward the center. As the dust reaches the center or in vertical alinement with the discharge slot 44, the feed wipers 35 which are also revolving at a high rate of speed, agitate and fluff the dust and due to centrifugal force toss it upwardly. By reference to the drawings, Figs. 1 and 2, it will be observed that the radius of each feed wiper is but slightly less than that defining the curvature of the bottom 19 of the hopper. Location of the shaft 23 in the axis of curvature of the bottom therefore prevents the dust from accumulating or packing in the bottom of the hopper, whereby it follows that the centrifugal action of the feed wipers mainly throws the dust upwardly.

Operation of the feeding and fluffng elements described has been found, in actual practice, to cause the dust to rise in the center of the hopper and be wormed from the ends to the center at the bottom thereof. Thereafter, as the dust pushes up in the center it falls off again toward the ends of the hopper at the upper level so that a circulation of the dust is maintained. Due to the location of the spiral and fluffing elements adjacent the bottom of the hopper the circulation, whether or not the hopper is full, is emphasized at the bottom where impaction becomes impossible. Even in the upper levels of the supply in the hopper, it is found that the dust is largely aerated and maintained very soft and free-flowing so as to be characterized throughout by a condition excellent for regular feeding.

Maintenance of such general characteristic through the body of the dust supply has the additional advantage of obviating agitators, power or motor driven, having distinct rates of speed and makes feasible the simple, high-speed drive illustrated.

As the dust falls through the feed holes 44 and 56 it enters the dust chamber 61 through the opening 80 and is drawn into the fan to be discharged through the pipe couplings 69. Distribution achieved is excellent and maintainable at a constant rate due to the free-flowing nature of the supply, the constant rate of discharge resulting from the fluffing step and absence of impaction adjacent the feed outlet of the hopper due to the circulation of the supply mass.

Another advantage derived from the mechanism and method described above is the obtaining of a boiling action in the powder supply, the dust rising at the center of the hopper functioning to keep the feed hole entirely clean and clear at all times so that the dust constantly fed out is always available in a finely divided state.

Provision of the oppositely acting pusher elements is particularly advantageous where hoppers of the conventional substantial width are employed, although favorable results have been obtained with very narrow hoppers by locating the feed outlet slot in one end of the hopper and utilizing a single spiral pusher element to advance the dust from the opposite side of the hopper to the feed outlet, where it may be fluffed by the feed wiper.

I claim:

In a mechanism for distributing insecticidal powder, a frame, a vertical hopper supported thereabove, said hopper having inclined sides converging toward a rounded bottom, a powder feeding slot in said bottom, a flexible regulator plate slidable in close engagement with the exterior of said bottom, a graduated orifice in said regulator for correspondence with the feed slot in the hopper bottom, resilient means for holding said regulator plate in order that the orifice therein shall normally bear a pre-determined relation with the feed slot, and adjustable means on the opposite side of the hopper for moving said regulator plate to alter said pre-determined relation.

JOHN A. CHATER.